(12) United States Patent
Seiler et al.

(10) Patent No.: US 7,213,638 B2
(45) Date of Patent: May 8, 2007

(54) HEAT EXCHANGER WITH FLOW CIRCUITING END CAPS

(75) Inventors: Thomas F. Seiler, Milton (CA); Matthias Kistner, Muirancourt (FR)

(73) Assignee: Dana Canada Corporation, Oakville, Ontario (CA)

( * ) Notice: Subject to any disclaimer, the term of this patent is extended or adjusted under 35 U.S.C. 154(b) by 442 days.

(21) Appl. No.: 10/821,771

(22) Filed: Apr. 9, 2004

(65) Prior Publication Data

US 2004/0238162 A1 Dec. 2, 2004

(30) Foreign Application Priority Data

Apr. 11, 2003 (CA) .................................. 2425233

(51) Int. Cl.
F28D 1/053 (2006.01)

(52) U.S. Cl. .................... 165/148; 165/171; 165/179; 29/890.03

(58) Field of Classification Search ................ 165/148, 165/153, 170, 171, 179; 29/890.03
See application file for complete search history.

(56) References Cited

U.S. PATENT DOCUMENTS

| | | | |
|---|---|---|---|
| 1,049,695 | A | 1/1913 | Garrison |
| 1,318,875 | A | 10/1919 | Hutchinson |
| 1,775,819 | A | 9/1930 | Fischer et al. |
| 1,996,622 | A | 4/1935 | Lambert |

(Continued)

FOREIGN PATENT DOCUMENTS

CH 220299 3/1942

(Continued)

OTHER PUBLICATIONS

European Patent Office; Invitation to Pay Additional Fees, including a Communication Relating to the Results of the Partial International Search for International Application No. PCT/CA04/000541 mailed Aug. 18, 2004.

(Continued)

Primary Examiner—Teresa J. Walberg
(74) Attorney, Agent, or Firm—Ridout & Maybee LLP

(57) ABSTRACT

A heat exchanger that includes an extruded core member defining a plurality of spaced apart flow passages. The core member has first and second sides, one of said first and second sides defining a first set of flow openings communicating with the flow passages and one of said first and second sides defining a second set of flow openings communicating with the flow passages. A first unitary end cap connected to the first end of the core member has a first member sealing the first flow passage ends of at least some of the flow passages, and a second member extending from the first member partially over the side of the core member defining the first set of flow openings and defining at least one flow path between at least some of the first set of flow openings. A second unitary end cap connected to the second end of the core member has a first member sealing the second flow passage ends of at least some of the flow passages, and a second member extending from the first member partially over the side of the core member defining the second set of flow openings and defining with the core member at least one flow path between at least some of the second set of flow openings.

31 Claims, 13 Drawing Sheets

U.S. PATENT DOCUMENTS

| | | |
|---|---|---|
| 2,039,593 A | 5/1936 | Hubbuch et al. |
| 2,154,216 A | 4/1939 | Savage |
| 2,547,668 A | 4/1951 | Simelaar |
| 2,582,358 A | 1/1952 | Schoellerman |
| 2,796,239 A | 6/1957 | Holmes et al. |
| 2,814,470 A | 11/1957 | Peterson |
| 2,981,520 A | 4/1961 | Chadburn |
| 2,985,434 A | 5/1961 | Bering et al. |
| 3,024,003 A | 3/1962 | Speca et al. |
| 3,141,500 A | 7/1964 | Raskin |
| 3,147,800 A | 9/1964 | Tadewald |
| 3,650,310 A | 3/1972 | Childress |
| 3,800,868 A | 4/1974 | Berkowitz |
| 3,818,984 A | 6/1974 | Nakamura et al. |
| 4,002,200 A | 1/1977 | Raskin |
| 4,072,188 A | 2/1978 | Wilson |
| 4,085,728 A | 4/1978 | Tomchak |
| 4,134,195 A | 1/1979 | Jacobsen et al. |
| 4,361,184 A | 11/1982 | Bengtsson |
| 4,478,277 A | 10/1984 | Friedman et al. |
| 4,574,876 A | 3/1986 | Aid |
| 4,615,129 A | 10/1986 | Jackson |
| 4,646,815 A | 3/1987 | Iwata |
| 5,009,557 A | 4/1991 | Dessirier |
| 5,028,989 A | 7/1991 | Naganuma et al. |
| 5,099,311 A | 3/1992 | Bonde et al. |
| 5,129,473 A | 7/1992 | Boyer |
| 5,152,255 A | 10/1992 | Fukuda |
| 5,159,529 A | 10/1992 | Lovgren et al. |
| 5,174,258 A | 12/1992 | Tanaka |
| 5,205,348 A | 4/1993 | Tousignant et al. |
| 5,228,511 A | 7/1993 | Boquel et al. |
| 5,232,066 A | 8/1993 | Schnelker |
| 5,251,718 A | 10/1993 | Inagawa |
| 5,273,386 A | 12/1993 | Luhm |
| 5,285,347 A | 2/1994 | Fox et al. |
| 5,316,077 A | 5/1994 | Reichard |
| 5,381,510 A | 1/1995 | Ford et al. |
| 5,423,376 A | 6/1995 | Julien et al. |
| 5,490,559 A | 2/1996 | Dinulescu |
| 5,495,889 A | 3/1996 | Dubelloy |
| 5,517,757 A | 5/1996 | Hayashi et al. |
| 5,586,614 A | 12/1996 | Kouchi et al. |
| 5,758,720 A * | 6/1998 | Moser .................. 165/148 |
| 5,787,613 A | 8/1998 | Derome |
| 5,829,517 A | 11/1998 | Schmid et al. |
| 5,884,588 A | 3/1999 | Ap |
| 5,901,037 A | 5/1999 | Hamilton et al. |
| 5,918,664 A | 7/1999 | Torigoe |
| 5,934,364 A | 8/1999 | Chrysler et al. |
| 5,957,230 A | 9/1999 | Harano et al. |
| 5,979,542 A | 11/1999 | Inoue |
| 5,984,000 A | 11/1999 | Nakamura et al. |
| 5,992,552 A | 11/1999 | Eto |
| 6,098,706 A | 8/2000 | Urch |
| 6,109,217 A | 8/2000 | Hedlund et al. |
| 6,227,290 B1 | 5/2001 | Nishishita et al. |
| 6,241,011 B1 | 6/2001 | Nakamura et al. |
| 6,293,338 B1 | 9/2001 | Chapman et al. |
| 6,305,463 B1 | 10/2001 | Salmonson |
| 6,340,053 B1 | 1/2002 | Wu et al. |
| 6,438,840 B2 | 8/2002 | Tavi et al. |
| 6,536,516 B2 | 3/2003 | Davies et al. |
| 6,729,389 B2 | 5/2004 | Ohashi |
| 6,843,512 B2 | 1/2005 | Fritze et al. |
| 2003/0164233 A1 | 9/2003 | Wu et al. |
| 2003/0173068 A1 | 9/2003 | Davies et al. |
| 2004/0069474 A1 | 4/2004 | Wu et al. |
| 2005/0115700 A1 | 6/2005 | Martin et al. |
| 2005/0115701 A1 | 6/2005 | Martin et al. |

FOREIGN PATENT DOCUMENTS

| | | |
|---|---|---|
| DE | OS 2 201 559 | 7/1973 |
| DE | 33 28 229 | 10/1985 |
| DE | 297 15 878 U1 | 9/1997 |
| DE | 297 22 841 U1 | 12/1997 |
| DE | 298 03 166 | 5/1998 |
| DE | 197 02 440 A1 * | 7/1998 |
| DE | 202 07 168 U1 | 5/2002 |
| EP | 0805328 | 11/1997 |
| EP | 0807756 | 11/1997 |
| EP | 0826874 | 3/1998 |
| EP | 0 890 810 | 1/1999 |
| EP | 0890810 | 1/1999 |
| EP | 0907061 | 4/1999 |
| FR | 1189606 | 10/1959 |
| FR | 1534246 | 7/1968 |
| FR | 2748800 | 11/1997 |
| FR | 2769082 | 4/1999 |
| FR | 2772838 | 6/1999 |
| FR | 2774462 | 8/1999 |
| FR | 2774463 | 8/1999 |
| FR | 2774635 | 8/1999 |
| FR | 2778973 | 11/1999 |
| FR | 2785377 | 5/2000 |
| GB | 259824 | 10/1926 |
| GB | 766331 | 1/1957 |
| GB | 2277781 | 11/1994 |
| JP | 61-66061 | 4/1986 |
| JP | 61-243280 | 4/1986 |
| JP | 7-280484 | 10/1995 |
| WO | 94/23257 | 10/1994 |
| WO | 94/23449 | 10/1994 |
| WO | WO 94/23257 * | 10/1994 |
| WO | 01/25711 | 4/2001 |
| WO | WO 03/059598 | 7/2003 |
| WO | WO 03/71213 | 8/2003 |

OTHER PUBLICATIONS

Fuel Cooling Needs for Advanced Diesel Engines by Michael Davies, John Burgers and Nick Kalman in SAE Technical Paper Series, May 19-22, 1997.

* cited by examiner

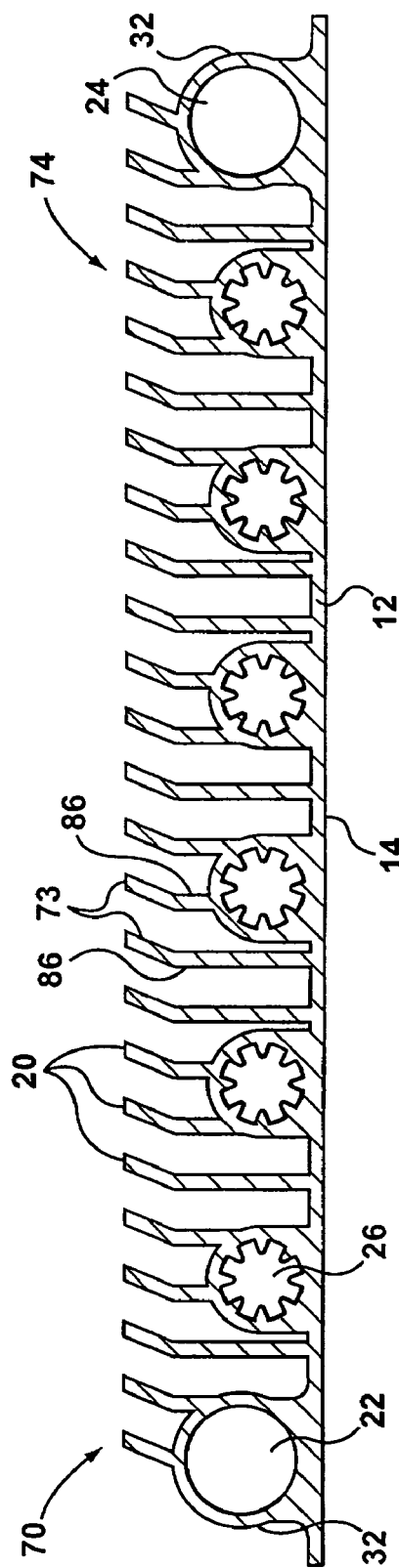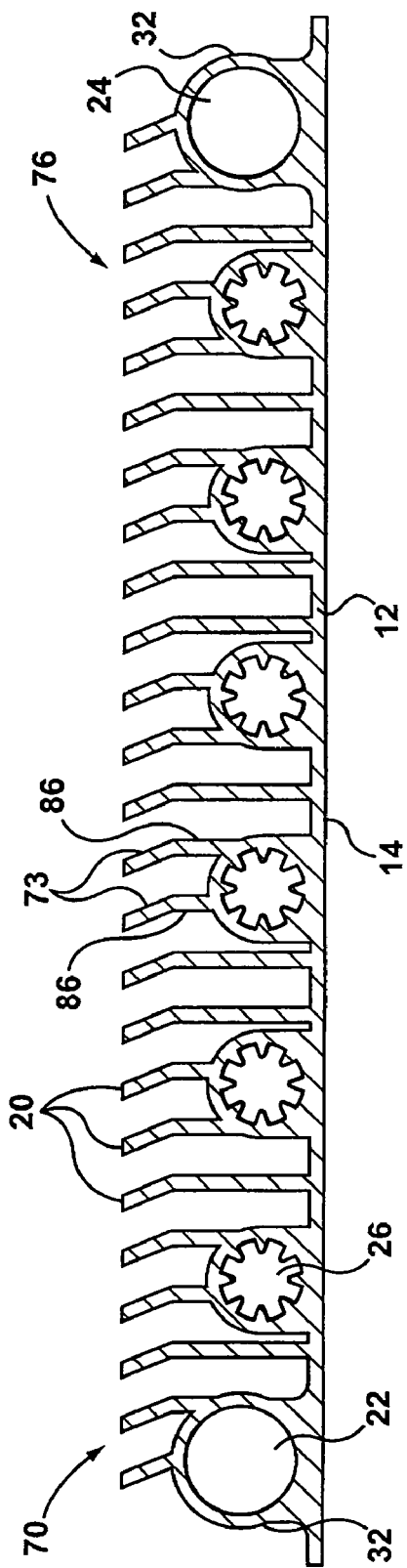

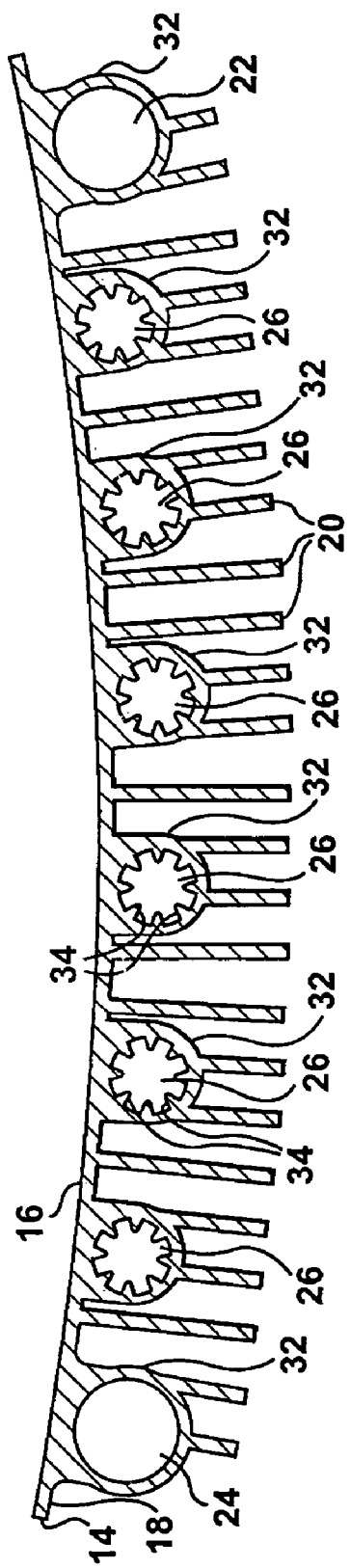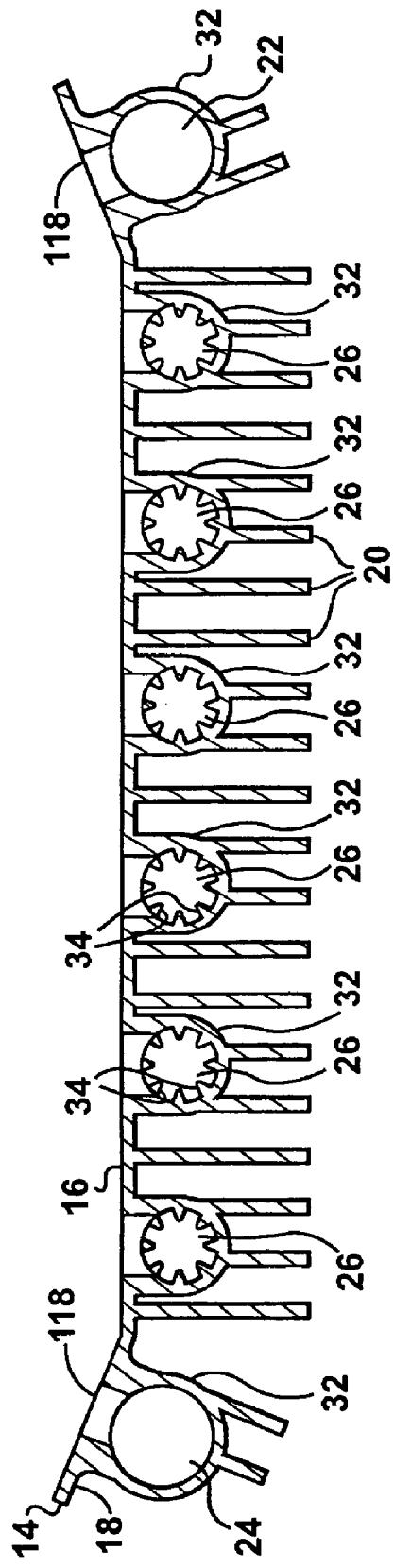

HEAT EXCHANGER WITH FLOW CIRCUITING END CAPS

This application claims priority to Canadian Patent Application No. 2,425,233, filed Apr. 11, 2003.

BACKGROUND OF THE INVENTION

The present invention relates to extruded heat exchangers having internal fluid passages.

In recent years, it has become desirable, if not necessary, to cool the fuel used by the engines of motor vehicles especially diesel engine powered vehicles. The most convenient way to do this is to insert a heat exchanger in series in a fuel line running between the engine and the fuel tank of the motor vehicle. Further, in order to keep the installation of these heat exchangers as simple and inexpensive as possible, air cooled heat exchangers are sometimes chosen in order to eliminate the need for coolant lines to be run to the heat exchanger. An example of such a cooler can be seen in U.S. Pat. No. 6,536,516 issued Mar. 25, 2003

Since the fuel lines usually run along the underside or underbody of the motor vehicle, it has been found to be convenient to mount the fuel coolers on the underbody of the vehicle. A difficulty with this, however, is that the heat exchangers are exposed to the elements and thus subject to damage. In northern climates, ice and snow can also cause a problem with the efficiency of the heat exchangers. Another concern is that the heat exchangers must be low in height or have a low profile in order to provide sufficient clearance between the underbody of the vehicle and the road surface.

One attempt to meet the desired design criteria and overcome the above-mentioned difficulties is shown in European patent application No. EP 0 890 810 published on Jan. 13, 1999. This patent shows a fuel cooler that has an extruded or continuously cast main body containing a plurality of longitudinal internal flow channels. This main body has open ends. Another member with cooling ribs or fins is attached to the main body. Finally, end pieces or closing elements are used to close off the open ends of the main body and make the fuel flow in series through the fluid channels in the main body.

There is however, a need for a heat exchanger that is simpler and more cost effective to manufacture than those previously available.

SUMMARY OF THE INVENTION

According to one aspect of the invention, there is provided a heat exchanger that includes a core member defining at least two flow passages extending from a first end to a second end of the core member, the flow passages each having opposed first and second flow passage ends located at the first and second ends of the core member, respectively, the core member having first and second sides extending from the first end to the second end thereof, flow openings being provided through the first side in flow communication with the flow passages. A first plate member seals the flow passage ends at one end of the core member, and a second plate member is integrally connected to the first plate member and extends partially over the first side a predetermined distance from the one end of the core member. The second plate member is secured to the first side of the core member and defines with the first side of the core member a flow path between the flow openings, wherein a fluid flowing through one of the at least two flow passages is circuited to the other of the at least two flow passages through the flow openings and the flow path.

According to another embodiment, the core member defines a plurality of the flow passages, and has first and second sets of the flow openings defined in one of the first and second sides. The first plate member and the second plate member together form a first unitary end cap connected to the first end of the core member. A second unitary end cap is connected to the second end of the core member, the second end cap having a first section sealing adjacent flow passage ends of at least some of the flow passages, and a second section extending from the first section of the second end cap partially over the side of the core member defining the second set of flow openings, the second section defining with the core member at least one flow path between at least some of the second set of flow openings.

According to another aspect of the invention, there is provided a method of forming a surface cooled heat exchanger, including steps of: (a) providing an extruded core member defining a plurality of spaced apart flow passages, each of the flow passages having opposed first and second flow passage ends located at first and second ends of the core member, respectively, the core member having first and second sides extending from the first end to the second end thereof, one of said first and second sides defining a first set of flow openings communicating with the flow passages and one of said first and second sides defining a second set of flow openings communicating with the flow passages; (b) providing a first unitary end cap and mounting the first end cap to the first end of the core member, the first end cap having a first member sealing the first flow passage ends of at least some of the flow passages, and a second member integrally connected to the first member and extending from the first member of the first end cap partially over the side of the core member defining the first set of flow openings, the second member including a substantially planar portion secured to the side of the core member defining the first set and a crossover recess defined by an outwardly projecting area formed in the planar portion, the crossover recess of the second member and the core member defining at least one flow path between at least some of the first set of flow openings; and (c) providing a second unitary end cap and mounting the second end cap to the second end of the core member, the second end cap having a first member sealing the second flow passage ends of at least some of the flow passages, and a second member extending from the first member of the second end cap partially over the side of the core member, defining the second set of flow openings, the second member of the second end cap and the core member defining at least one flow path between at least some of the second set of flow openings.

BRIEF DESCRIPTION OF THE DRAWINGS

Example embodiments of the present invention will be described, by way of example with reference to the following drawings, in which:

FIG. 8 is a sectional view, taken across line VIII—VIII of FIG. 7;

FIG. 9 is a sectional view, taken across line IX—IX of FIG. 7;

FIGS. 17A and 17B are each sectional views of alternative embodiment of a core of the heat exchanger of FIG. 1;

Like reference numbers are used to refer to similar elements through out the Figures.

DESCRIPTION OF EXAMPLE EMBODIMENTS

Figure 1:
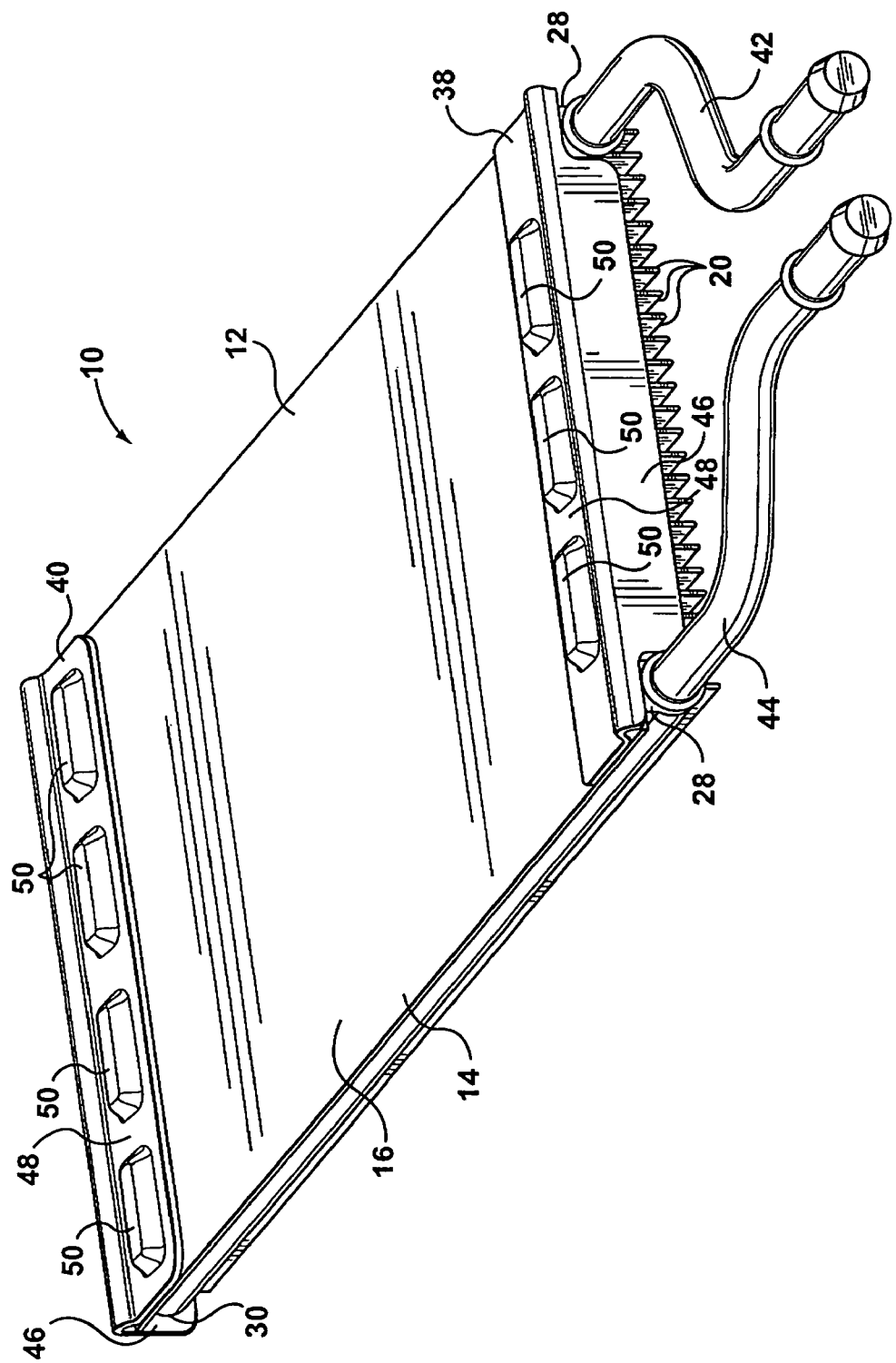
FIG. 1 is a perspective view, from the top, left, of one embodiment of a heat exchanger according to the present invention.
Figure 2:
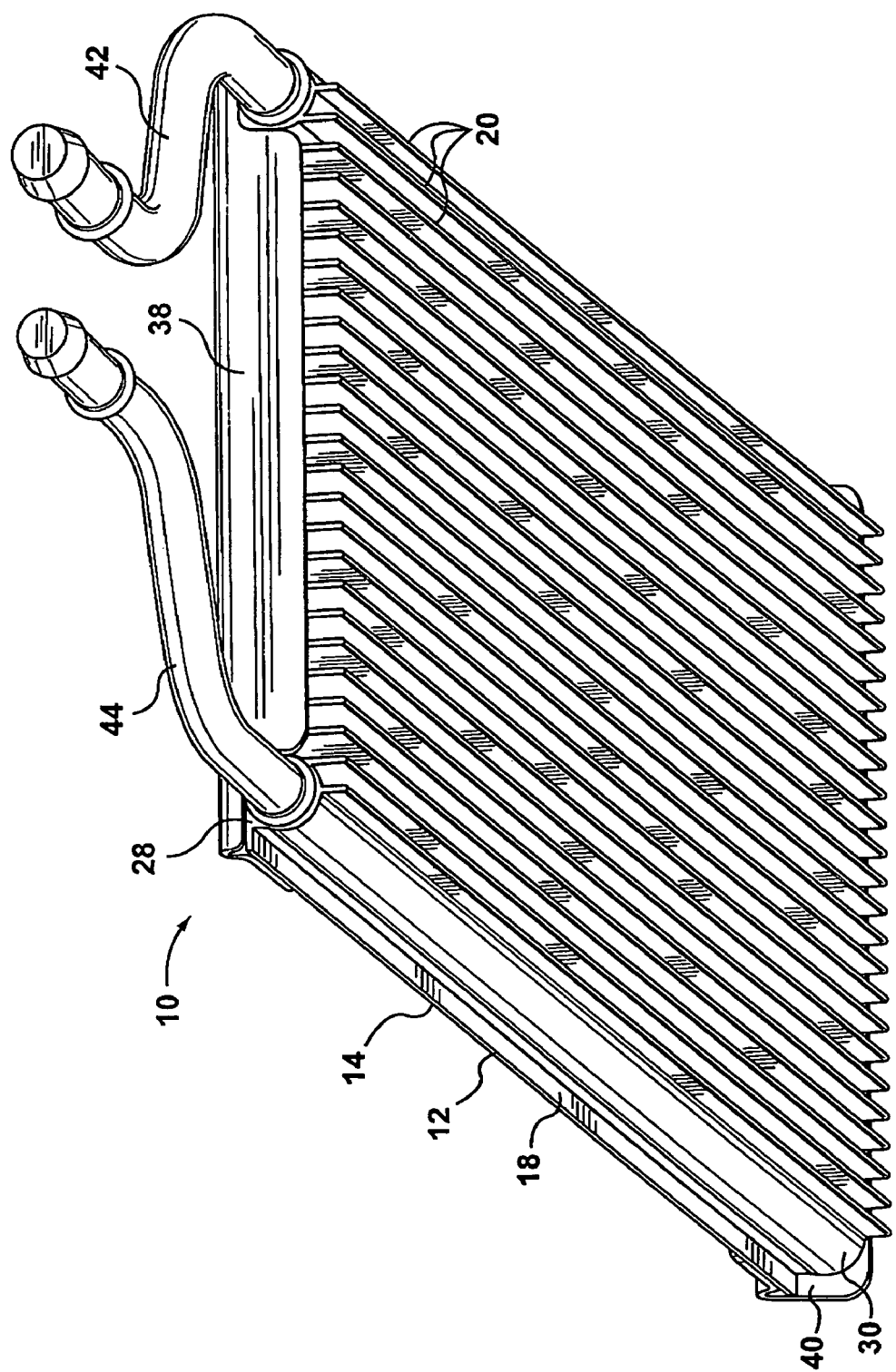
FIG. 2 is a perspective view, from the bottom, left, of the heat exchanger of FIG. 1.

Referring to FIGS. 1 to 4, an example embodiment of a heat exchanger according to the present invention is generally indicated by reference numeral 10. Heat exchanger 10 is particularly useful as a fuel cooler and as such is an air cooled or liquid to air heat exchanger. It will be appreciated, however, that heat exchanger 10 can also be used to heat fluids, and it can also be used with fluids other than air and fuel. The heat exchanger 10 could also be used as a cold plate for mounting and cooling electronic and other components.

Heat exchanger 10 includes an elongated core member 12 which has a planar plate-like portion 14 having an upper or first side surface 16 and a lower or second side surface 18. A plurality of spaced-apart fins 20 extend outwardly from the second side surface 18. The spacing, size, and orientation of fins 20 can be chosen to give predetermined or desired heat transfer characteristics to heat exchanger 10.

Figure 3:
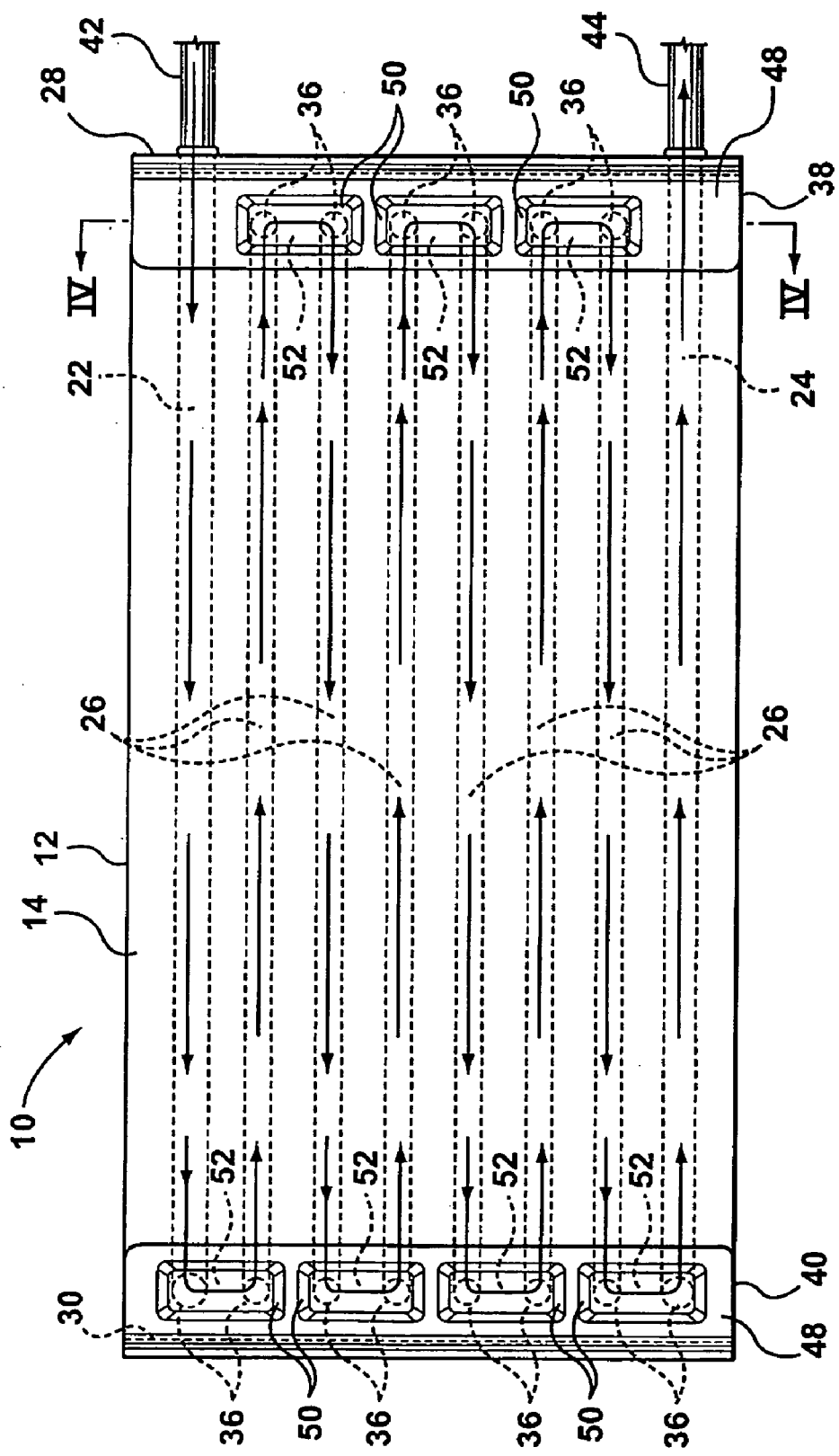
FIG. 3 is a top plan view of the heat exchanger of FIG. 1.
Figure 4:
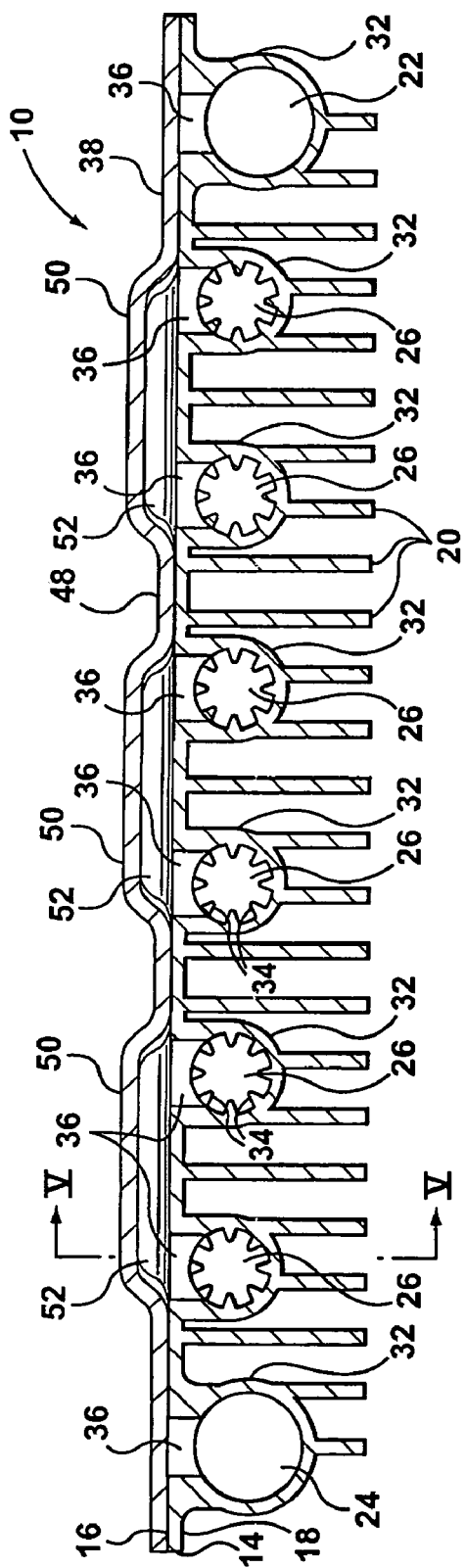
FIG. 4 is a sectional view, taken across the line IV—IV of FIG. 3.

As best seen in FIGS. 3 and 4, a plurality of spaced-apart flow passages, including first and last flow passages 22, 24, and a plurality of intermediate flow passages 26 are formed in the core 12. The flow passages 22, 24, 26 are defined by open-ended tubular walls 32 extending along the second side surface 18 of the plate 14 from a first end 28 to a second end 30 of the core 12. As can be seen in FIG. 4, some of the fins 20 can extend outward from tubular walls 32. Elongated internal fins 34 are formed on the inside tubular walls 32 of intermediate flow passages 26 for enhancing heat exchange and/or turbulizing fluid flow through the flow passages. In some embodiments, internal fins 34 are omitted entirely or replaced with separately formed flow augmenting turbulizers located in the flow passages. In heat exchanger 10, internal fins are omitted from first and last flow passages 22, 23 to facilitate the insertion of inlet and outlet fittings 42, 44 into the ends of such passages. However, in some embodiments internal fins are also provided partially or fully along the lengths of the first and last flow passages 22, 24. In heat exchanger 10, the first and last flow passages have larger diameters than the intermediate flow passages to accommodate inlet and outlet fittings 42, 44. However, in other embodiments, the flow passages all have identical sizes.

As best seen in FIGS. 3 and 4, flow openings 36 are provided through the plate 14 in flow communication with each of the flow passages 22, 24, 26. More particularly, each intermediate flow passage 26 has at least two flow openings 36 communicating therewith, one located near the first end 28 of the core 12, and the other located near the second end 30 of the core 12. Each of the first and last flow passage 22, 24 has at least one flow opening 36 communicating with it (located near the second end 30 in the illustrated embodiment).

The heat exchanger 10 includes first and second end caps 38, 40 that are secured to first and second ends 28, 30, respectively, of the core 12. The end caps 38 and 40 plug the otherwise open ends of the intermediate flow passages 26, and, in the illustrated embodiment, one end of each of the first and last flow passages 22, 24. The ends caps 38 also cooperate with flow openings 36 to provide flow circuiting through the flow passages 22, 24, 26 of the core 12. Inlet and outlet fittings 42 and 44 are connected to the ends of first and final flow passages 22, 24, respectively, that are not plugged by one of the end caps.

Figure 5:
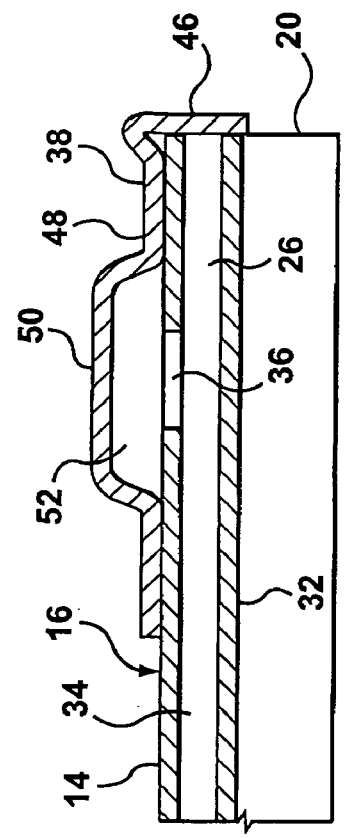
FIG. 5 is a partial sectional view, taken across the line V—V of FIG. 4.

Each of the end caps 38, 40 includes a plug portion 46 for extending over and plugging the ends of the flow passages and a flow circuiting portion 48 that extends partially over the first side 16 of the plate 14, over openings 36. In the illustrated embodiment, the plug portion 46 and flow circuiting portion are substantially orthogonal to each other, although other angles conforming to the relative angle between the side 16 of plate 14 and the core ends 28, 30 could be used. As best seen in FIGS. 1 and 5, the plug portion 46 is a substantially planar plate member that extends across the open ends of the core flow passages. As shown in the embodiment of FIGS. 1–5, the plug portion 46 is rectangular—however other shapes could be used, including configurations that provide more air side exposure of fins 20, so long as the plug portion sealably covered the ends of the flow passages (see for example, the embodiment of FIG. 6 which is discussed in greater detail below).

As can be appreciated from the Figures, in the presently described embodiment, the plug portion 46 of the second end cap 40 sealably plugs the ends of all of the flow passages 22, 24, 26 that are located at the second core end 30, however, at the first core end 28, the plug portion 46 of the first end cap 38 only blocks the ends of the intermediate passages 26, in order to accommodate inlet and outlet fittings 42, 44. Of course, the inlet and outlet fittings need not be located at the same end of the heat exchanger in all embodiments, and in some embodiments may be located at locations of the core other than at the ends, with modifications being made to plug portions 46 of ends caps 38, 40 to seal the ends of the flow passages as required for the particular heat exchanger configuration.

The flow circuiting portion 48 is a substantially planar plate that is sealably connected to the first side 16 of the plate and includes central raised crossover recesses or bumps 50 that, together with the first side 16 of plate 14, define sealed flow paths 52 that cooperate with flow openings 36 for circuiting fluid flow across the first side 16 of plate 14 between flow passages 22, 24, 26. The flow openings 36 are preferably located near enough to the core ends such that the surface area between the flow circuiting portion 48 and the first core side 16 is relatively small for bonding purposes, but still large enough to accommodate flow paths 52 and provide a suitably strong seal around the flow path perimeter. In some embodiments, recesses are formed in the first side of the plate 14, rather than, or in addition to, the crossover bumps 50 to define the flow paths between the flow openings 36.

The plates forming the flow circuiting portion 48 and plug portion 46 of each end cap are substantially orthogonal to each other, and a bend relief 49 (FIG. 5) is included in an example embodiment at the juncture of portions 46 and 48 to assist in achieving a robust orthogonal relationship between the circuiting and plug portions 48, 46. In various embodiments, the bend relief may be omitted, or replaced by a notch, or replaced with a relief slot opening.

The core 12 may be formed of aluminum or an aluminum alloy and is most conveniently made by extrusion, so that it can be made to any desired length simply by chopping or sawing the extrusion to a desired length. The flow openings 36 are bored, lanced, or otherwise formed through the core plate 14 at a predetermined distance from each end. In one embodiment, flow openings 36 are provided near both core ends in communication with each of the first and last flow passages 22, 24, with the unused flow openings 36 near the first core end 28 being sealed shut by portions of the first end cap 38 (see FIG. 4), such that the core ends 28, 30 are symmetrical prior to mounting of the end caps and fittings. Such a configuration can reduce tooling required to make the core 18, and also reduce the potential for manufacturing errors as the relative orientation of the core end is immaterial prior to connection of the end caps and fittings.

The end caps 38, 40 may be stamped and formed out of brazing clad aluminum, however in some embodiments, in order to provide increased corrosion resistance, non-clad aluminum could be used in combination with a brazing sheet insert, or a braze filler metal insert, or a filler metal paste or coating. Fittings 42, 44 may also be made from aluminum or an aluminum alloy. Embodiments of the heat exchanger can be made by assembling the components and brazing or soldering them together, such as by furnace brazing. In various embodiments other joining methods and materials are used such as, but not limited to epoxies, glues, welding, laser welding, and/or adhesive bonding, to secure the components together.

In some embodiments, the core 12 may be formed from suitable non-aluminum based materials, including but not limited to extruded or otherwise formed plastics, and one or more of the ends caps 28, 30, and fittings 42, 44 could also be formed from other materials such as plastics.

As indicated by the flow arrows in FIG. 3, in the presently described embodiment, a fluid to be cooled (for example, diesel fuel) enters the first flow passage 22 of the core 12 through inlet fitting 42. The fluid leaves the first flow passage 22 via the flow opening 36 near second core end 30, travels over the first side surface 16 of plate 14 through a flow path 52 and into the intermediate flow path 26 immediately adjacent the first flow passage 22. As can be appreciated from FIG. 3, end caps 38 and 40 are configured such that the fluid flows serially in a serpentine manner through each of the parallel intermediate flow passages 26, then through the last flow passage 24 and out of the core 12 through outlet fitting 44.

Figure 6:
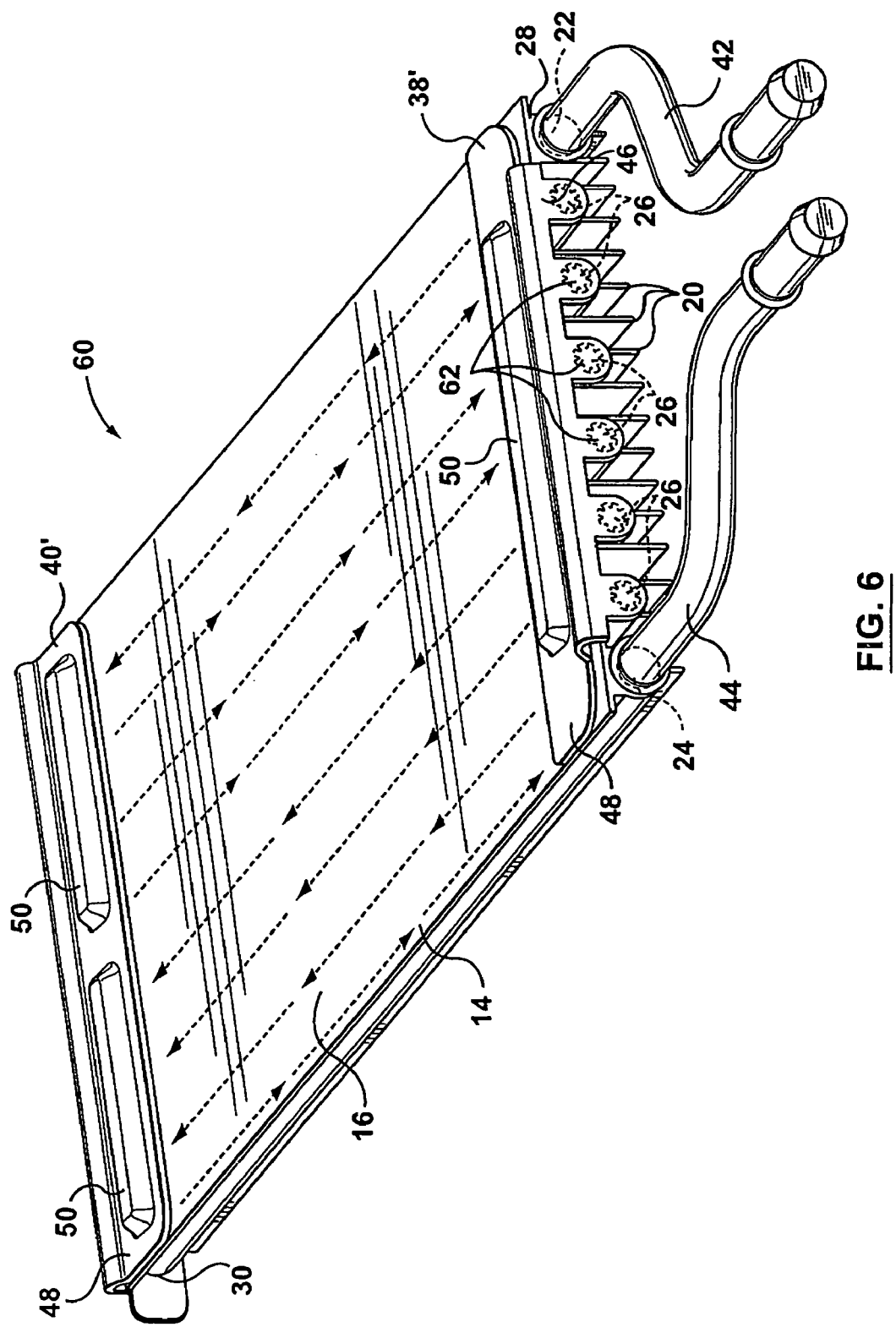
FIG. 6 is a perspective view of a further embodiment of a heat exchanger according to the present invention.

By modifying the end caps secured to the heat exchanger core 12, flow circuiting through the heat exchanger can be easily changed to achieve a desired flow circuiting for a particular application. By way of example, FIG. 6 shows a heat exchanger 60 according to a further embodiment of the invention, which is similar to heat exchanger 10, but which has modified first end cap 38' and second end cap 40'. First end cap 38' includes only a single cross-over bump 50 providing a flow path that communicates through the flow openings 36 (not shown in FIG. 6) at the first core end 28 with all of the intermediate flow paths 26, and the second end cap 30 modified to include two rather than four crossover bumps 50, one of which provides a flow path communicating with the flow openings 36 near core end 30 to the first flow passage 22 and the first three intermediate flow passages 26, and the other of which provides a flow path communicating with the flow openings 36 to the last flow passage 24 and the final three intermediate flow passages 26. As can be appreciated by the flow lines in FIG. 6, such an end cap configuration provides a heat exchanger flow pattern in which fluid flows from the first core end 28 to the second end 30 through the first flow path 28, then in parallel through the first three intermediate flow passages 26 from the second end 30 to first end 28, then in parallel through the next three intermediate flow passages 26 from the first end 28 to the second end 30, then back to the outlet fitting 44 through the last flow passage 24. In such a configuration the first and last flow passages 22 and 24 act as inlet and outlet manifolds, and may benefit from a cross-sectional area greater than the intermediate flow passages 26 (as can be seen in FIG. 4 for example). As can be seen in FIG. 6, the plug portion 46 of the end caps 38 includes a plurality of finger portions 62 for sealing the flow passage ends, with spaces being provided between the fingers 62 to increase air side exposure of fins 20 at the ends of the heat exchanger core.

The number of flow passages defined through the core 12 and the circuiting pattern provided by the end caps can differ from that illustrated and be selected to provide a predetermined or desired heat exchanger performance. The configuration of the present invention creates a great degree of flexibility as the end caps can be used without modification with different lengths of extruded cores 12. Additionally, different end caps can be used to provide a range of different flow pattern options for the same core configuration. The configuration of the present invention incorporates internal fluid routing and flow passage sealing functions into the end cap, thereby eliminating or reducing the need for expensive post-extrusion machining and milling steps to be performed on the core 12.

As described above, the end caps are of unitary construction, with flow circuiting portion 48 and plug portion 46 integrally formed together to provide an end cap. In some embodiments, however, separately formed flow circuiting portions and plug portions may be used at one or both ends of the core 12.

Figure 7:
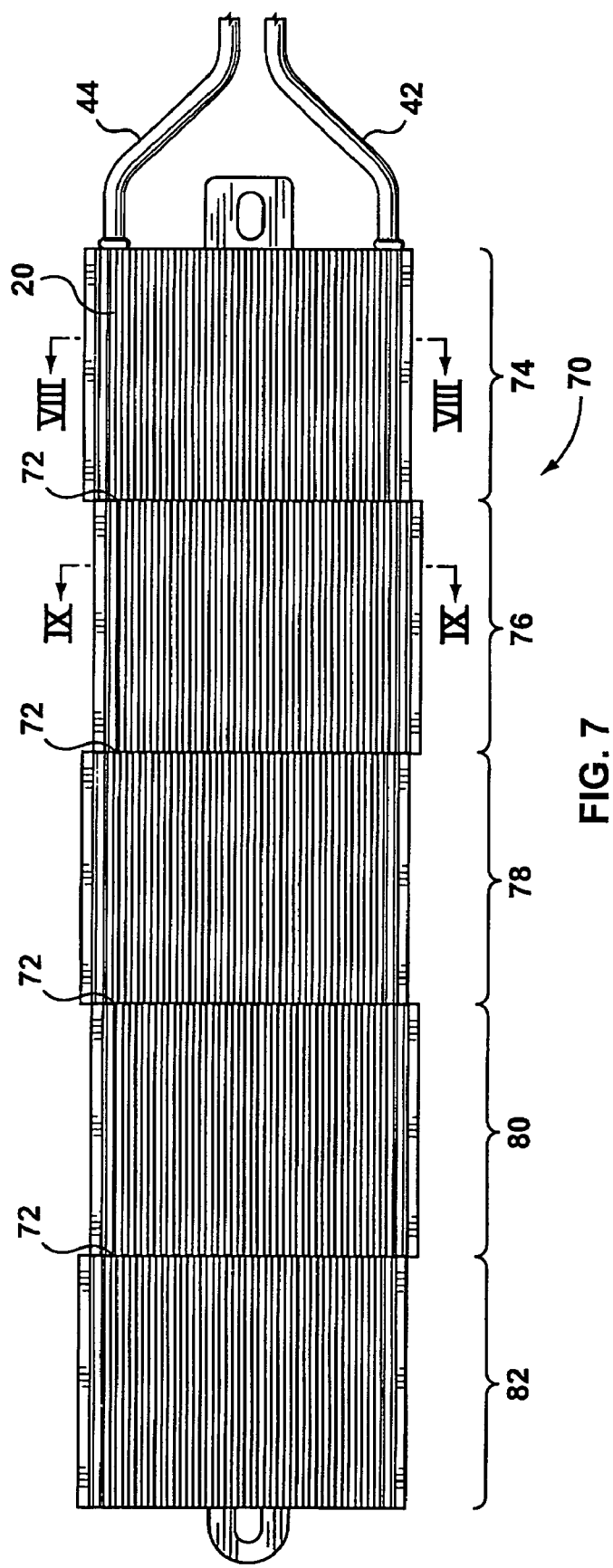
FIG. 7 is a bottom plan view of a heat exchanger according to a further embodiment of the present invention.

Referring now to FIGS. 7–9, a heat exchanger 70 according to further embodiments of the invention is shown. The heat exchanger 70 is similar to heat exchanger 10, except that the elongate fins 20 of heat exchanger 70 are divided by transverse cut lines 72 into a plurality of sections 74, 76, 78, 80, and 82, with the extending ends of the fins in successive sections being bent in alternating directions in order to break up the boundary layer of air (or other fluid) passing therethrough. As best seen in FIGS. 8 and 9 the outer ends 73 of the fins 20 in section 74 are bent at an angle laterally towards one longitudinal side edge of the core 12, and the outer ends 73 of the fins 20 in section 76 are bent at an angle laterally towards the other longitudinal side edge of the core. The fin ends 73 in sections 74, 78 and 82 are each bent in the same direction towards one side edge of the core, and the fin ends in alternating sections 76 and 80 are each bent in the same direction towards the other side edge of the core.

Figure 10:
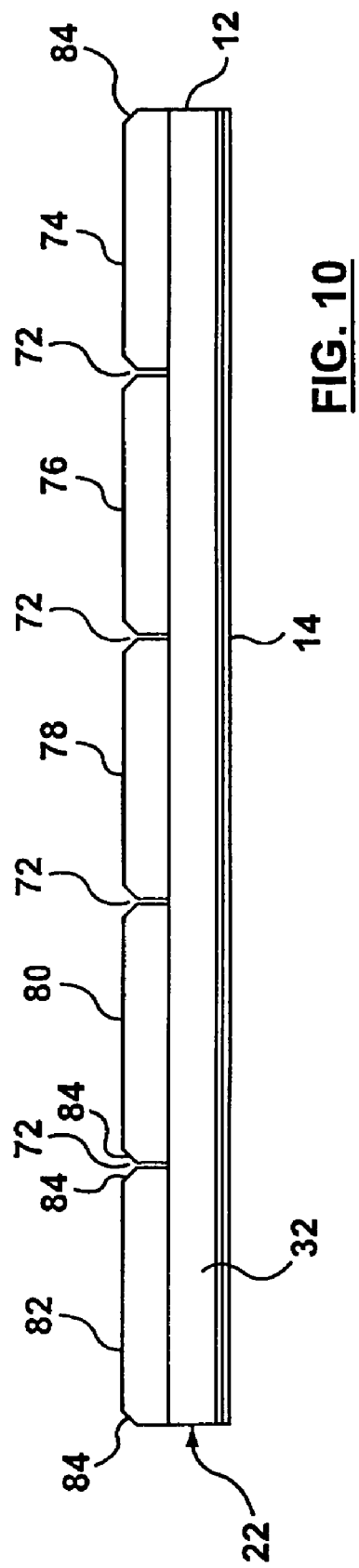
FIG. 10 is a side view of a core of the heat exchanger of FIG. 7.
Figure 11:
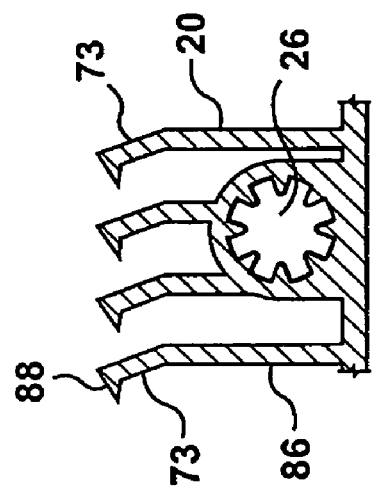
FIG. 11 is a partial sectional view of an alternative fin configuration of the heat exchanger of FIG. 7.
Figure 12:
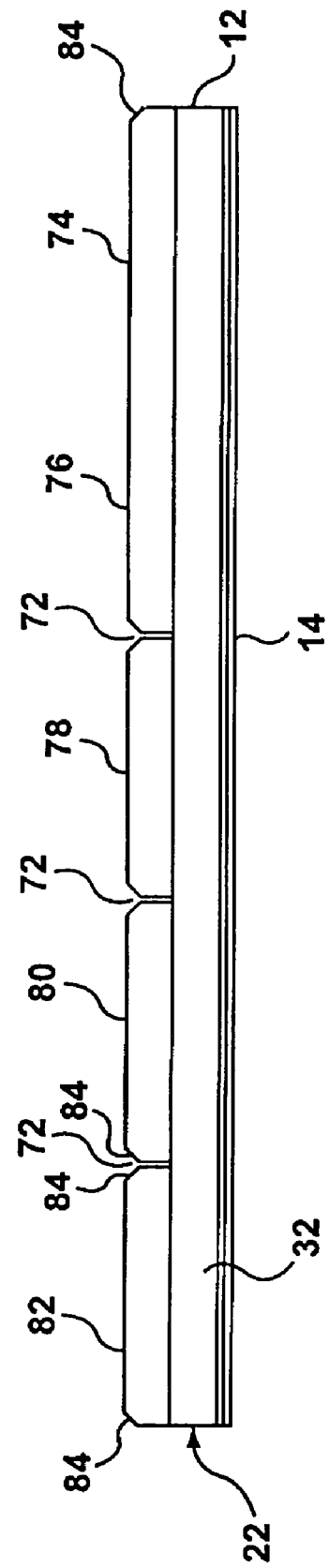
FIG. 12 is a side view, similar to FIG. 10, but showing an alternative fin configuration.

The bend angle and number and size of fin sections can be selected to provide a desired or predetermined heat exchange performance for a particular heat exchanger configuration and application. In some applications, only a narrow tip portion may be bent. As seen in FIGS. 8, 9 and 10, in the illustrated embodiment, the transverse cuts 72 end where the tubular walls 32 that define the first and last flow passages 22, 24 begin, with the fin portions 86 located between the cut line level and the core plate 14 being straight. The outer corners 84 of each of the fins 20 of each of the sections may be rounded near cuts 72 to reduce sharp edges. Cuts 72 can be made after the core 12 has been extruded, and the fin ends bent after or simultaneously with such cutting. FIG. 11 shows an alternative bent fin configuration that can be used in heat exchanger 70. As shown in FIG. 11, the outer tips of bent fin portions 73 are further bent over relative to straight fin portion 86. The cut and bend fin configuration of FIGS. 7–11 can be used with a range of heat exchanger configurations, for example, the extruded plates of the heat exchangers shown in U.S. Pat. No. 6,536,516 issued Mar. 25, 2003, could be cut and bent according to aspects of the present invention. The cuts 72 need not be transverse, and in some embodiments are at angles other than 90 degrees relative to the elongate side edges of the core 12, and in some embodiments the cuts run in alternating directions. In some embodiments, the lengths of the fin sections vary along the length of the heat exchanger, and in some embodiments the width of the cuts 72 vary along the length of the heat exchanger to provide for pressure recovery and/or to improve boundary layer breakup at transition from one fin section to the next. By way of example, FIG. 12 shows a fin configuration in which the length of the fin section 74 is longer than the successive fin sections 78, 80 and 82, and the size of the cut between fin sections varies along the heat exchanger.

Figure 13:
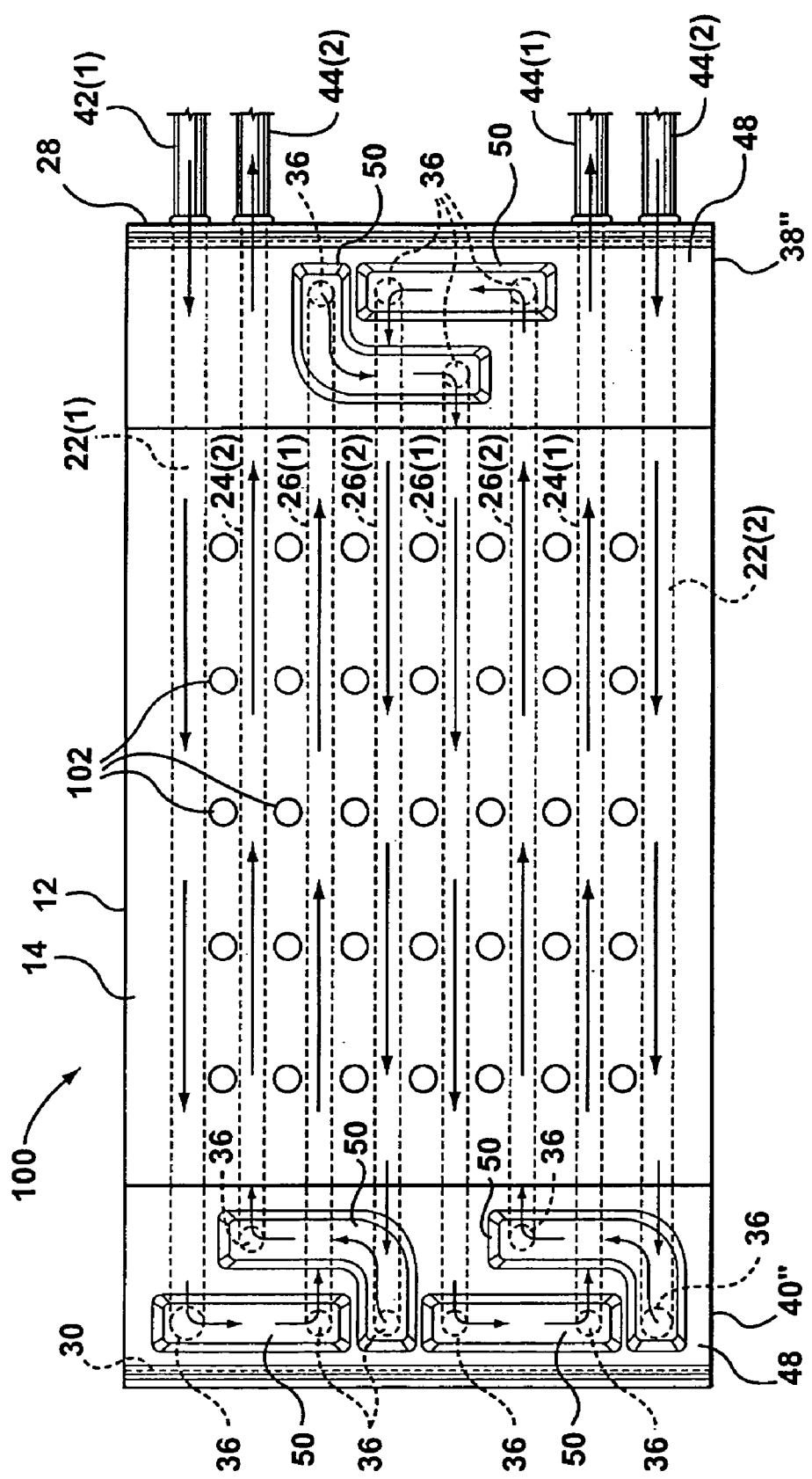
FIG. 13 is a top plan view of a further embodiment of a heat exchanger according to embodiments of the present invention.

FIG. 13 shows a further heat exchanger 100, according to another example embodiment of the invention, which is substantially the same as heat exchanger 10, except that the heat exchanger 100 is multi-fluid heat exchanger configured to circuit two separate fluids through the heat exchanger core. In order to provided for such circuiting, the flow circuiting portions 48 of end caps 38" and 40" are provided with two rows of cross-over bumps 50. On each of the flow circuiting portions 48, the cross over bumps 50 associated with the flow path for one fluid are offset, relative to the heat exchanger ends, a different distance than the cross over bumps 50 that are associated with the flow path for the other fluid. The flow openings 36 that communicate with the respective cross-over bumps 50 are also offset in a corresponding manner. In the example embodiment 100 shown in FIG. 13, one fluid enters the heat exchanger core through inlet fitting 42(1), flows through first flow passage 22(1), then through intermediate flow passages 26(1), then through flow passage 24(1) and out of the heat exchanger through outlet fitting 44(1). Another fluid flows through alternating parallel flow passages, by entering through inlet fitting 42(2), flowing through flow passages 22(2), 26(2), 24(2), and out of the heat exchanger through outlet fitting 44(2). It will be understood that many different circuiting patterns could be used. For example, in another example embodiment, rather than having the two fluids using alternating flow passages through the core as shown in FIG. 13, a first group of adjacent flow passages are circuited to provide a serpentine path for cooling a first fluid such as diesel fuel, and a second group of adjacent flow passages are circuited to provide a serpentine path for cooling a second fluid such as power steering fluid, such that the core effectively provides two heat exchangers side by side. Heat exchanger 100 could also be configured to circuit more than two internal fluids.

In various embodiments of the invention, air flow openings 102 are provided through the plate 14 of the core, between fins 20, to permit air to flow through the plate. Such openings 102, which are in various embodiments circular, oval, rectangular slots, or other configurations, can be seen in FIG. 13.

Figure 18:
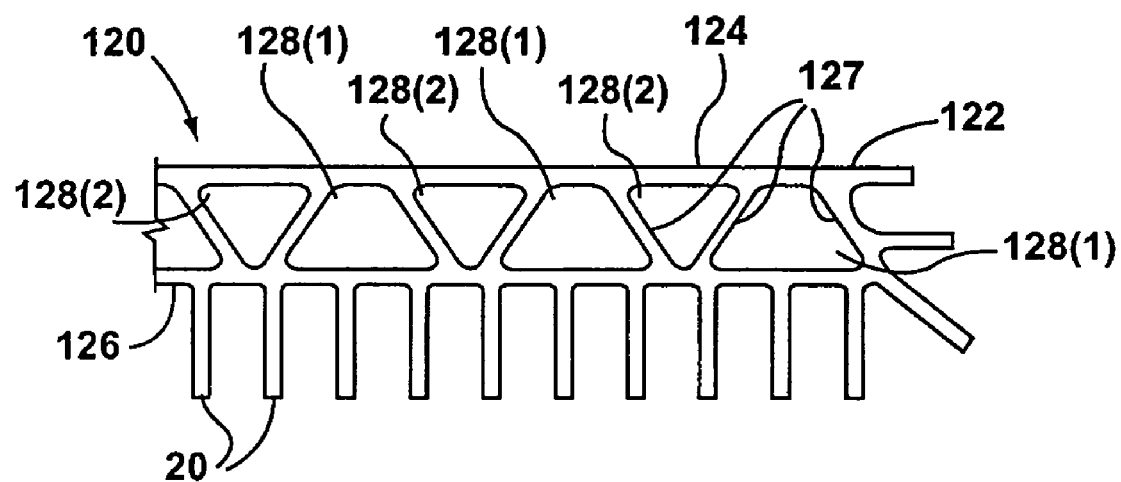
FIGS. 18 and 19 are partial sectional views each showing further alternative core configurations for heat exchangers according to embodiments of the present invention.

FIG. 18 shows a sectional view of a further example embodiment of a multi-fluid heat exchanger 120. Heat exchanger 120 is similar to heat exchanger 100, however, instead of having flow passages defined by annular walls 32 that are located along the plate 14, the flow passages 128(1) and 128(2) of the heat exchanger 120 are formed internally in between upper and lower planar plates 124 and 126 of a substantially hollow core 122. Fins 20 extend outward from lower plate 126. Spaced-apart walls 127 that extend between upper and lower plates 124 and 126 divide the area between the plates 124 and 126 into internal flow passages 128(1) and 128(2) with trapezoidal cross-sections. As with heat exchanger 100, end caps 38" and 40" (not shown in FIG. 18) are used to plug the ends of flow passages 128(1) and 128(2), and to provide flow circuiting between the flow passages through flow openings provided through the upper plates. In one embodiment, a first fluid flows through flow passages 128(1), and a second fluid flows through alternating passages 128(2). Due to the trapezoidal cross-section of the flow passages, fluid passages 128(1) have a larger heat exchanger surface with the lower plate 126 than upper plate 124, and the opposite is true for fluid passages 128(2). Thus, a first fluid in flow passages 128(1) can reject heat to air side fins 20, while a second fluid in flow passages 128(2) can reject heat to the first fluid, for warming the first fluid during an initial warm-up period, for example.

Figure 14:
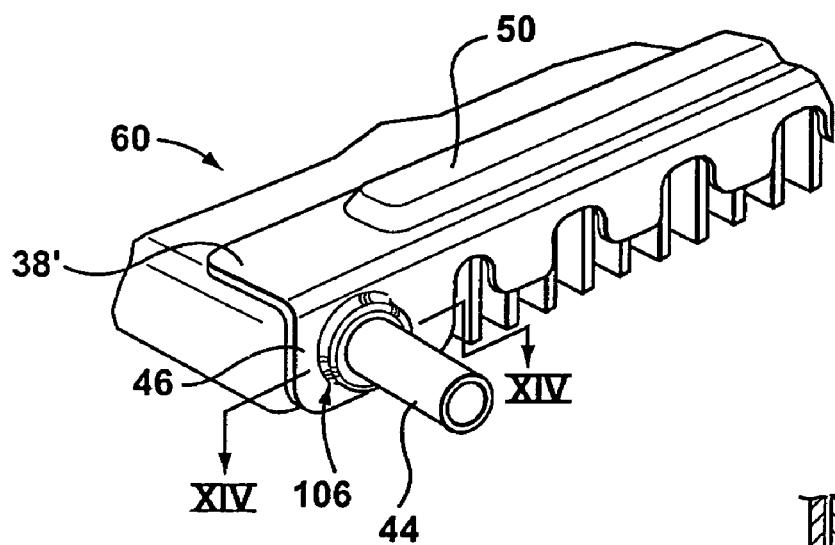
FIG. 14 is a partial perspective view of the heat exchanger of FIG. 6 with an alternative end cap configuration.
Figure 15:
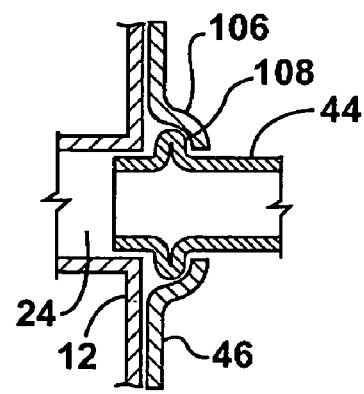
FIG. 15 is a partial sectional view, taken across line XIV—XIV of FIG. 14.

In a further example embodiment of the invention the plug portion 46 of end cap 38 is configured to provide support and/or a brazing surface for the inlet and outlet fittings. By way of example, FIGS. 14 and 15 show an alternative end cap configuration for heat exchanger 60 in which the plug portion 46 extends to surround the circumference of the opening to flow passage 24. The plug portion 46 includes a raised annular boss portion 106 through which a portion of the fitting 44 extends. An annular ring or protrusion 108 is provided on the fitting 44, and received behind and bonded to an inner surface of the annular boss portion 106. In a further embodiment, raised boss portion 106 is omitted, and the plug portion is flat, with ring 108 abutting against the outer surface of plug portion 104.

Figure 16:
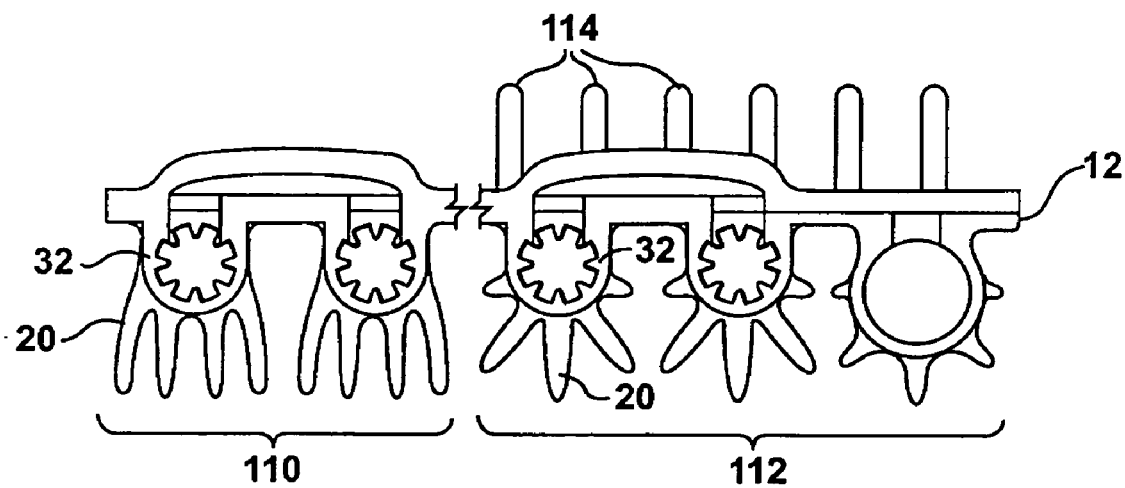
FIG. 16 is a partial sectional view showing alternative fin configurations of heat exchangers according to the present invention.

It will be appreciated that various alternative fin configurations can be used in various embodiments of the invention. By way of example, FIG. 16 shows further possible fin configurations, including a "comb" configuration, indicated by reference 110, in which fins 20 extend outward in a common direction from the annular walls 32, and a "star" configuration, indicated by reference 112, in which the fins 20 extend radially outward from annual flow passage walls 32. In some embodiments, fins 114 are provided extending outward from the first side of the core 12, in the area between end caps 38, 40. In some embodiments, fins 20 could have alternating curves or bends provided along their lengths from one end of the heat exchanger to the other in order to turbulize or breakup air flow therethrough.

In another example embodiment, the core 12 of the heat exchanger 10 is curved, as shown in FIG. 17A, to improve air side exposure of the fins and/or facilitate mounting of the heat exchanger. FIG. 17B shows a further embodiment in which the core 12 is largely flat, but the two opposed sides 118 are bent upwards relative to a central area of the core.

Figure 19:
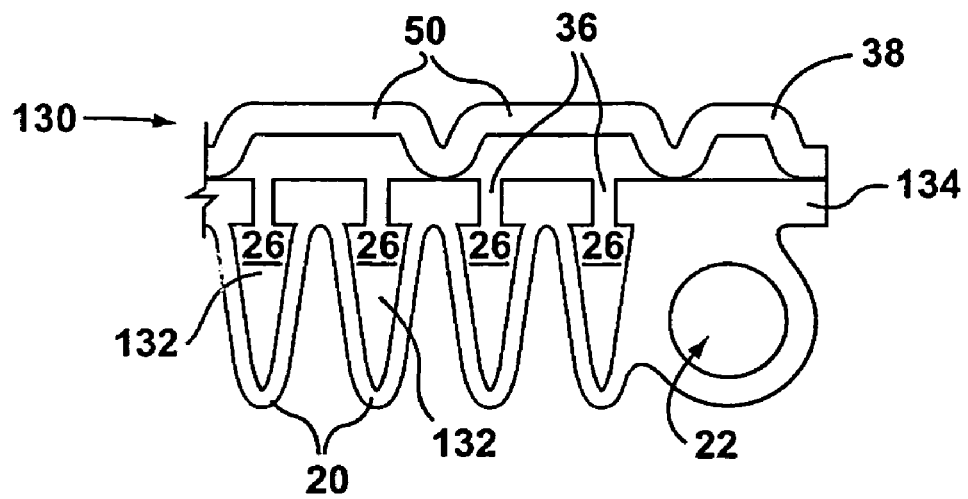

FIG. 19 shows a partial sectional view of another heat exchanger 130 of an example embodiment of the invention, which is similar to heat exchanger 10, but in which the flow passages 26 are formed within fins 132 of core 134. Such a configuration allows for improved heat transfer, particularly in applications where the core 134 is formed from plastics having lower heat transfer characteristics. Cross-over bumps 50 and flow openings 36 can be configured to allow fluid to be serially circuited through fins 132, circuited through groups of fins in parallel, and/or to permit multiple fluid circuiting.

In a further example embodiment of the invention, the planar first side surface 16 of the core of heat exchanger 10 is used to accommodate an electric heater (not shown), which is used to warm-up fuel under cold conditions—after the heater is turned off, the heat exchanger assumes a cooling function. As noted above, the heat exchanger is in various embodiments of the invention used in different applications other than heating and cooling of automotive related fluids, such as a cold plate for electronic devices such as power transistors. The planar surface of the first side of the core provides for good thermal contact with electronic devices for cooling, with primary cooling achieved by a liquid flowing through the internal flow passages and optional secondary cooling accomplished by the air-side fins.

Directional reference terms such as upper, lower, top, bottom, left and right are used in this specification for explanatory purposes only—the heat exchanger of the present invention can have any orientation desired. As will be apparent to those skilled in the art, many alterations and modifications are possible in the practice of this invention without departing from the spirit or scope thereof. Accordingly, the scope of the invention is to be construed in accordance with the substance defined by the following claims.

The invention claimed is:

1. A heat exchanger comprising:
   a core member defining at least two flow passages extending from a first end to a second end of the core member, the flow passages each having opposed first and second flow passage ends located at the first and second ends of the core member, respectively, the core member having first and second sides extending from the first end to the second end thereof, flow openings being provided through the first side in flow communication with the flow passages;
   a first plate member sealing the flow passage ends at one end of the core member;
   a second plate member integrally connected to the first plate member and including a substantially planar portion secured to the first side of the core member and extending over the first side a predetermined distance from the one end of the core member, said second plate member also including a crossover recess defined by an outwardly projecting area formed in the planar portion and defining with the first side a flow path between the flow openings,
   wherein a fluid flowing through one of the at least two flow passages is circuited to the other of the at least two flow passages through the flow openings and the flow path.

2. The heat exchanger of claim 1 wherein the flow openings are located near the one end of the core member.

3. The heat exchanger of claim 1 wherein the first plate member and the second plate member are substantially orthogonal to each other.

4. The heat exchanger of claim 1 wherein a plurality of spaced apart fins extend outward from the second side.

5. The heat exchanger of claim 4 wherein the fins run longitudinally from the first end to the second end of the core member and each have an outer end, the fins being divided along a longitudinal length thereof into successive fin sections, the outer ends of the fins in successive fin sections being angled in alternating directions.

6. The heat exchanger of claim 1 wherein the core member includes at least three of said flow passages each having opposed first and second flow passage ends located at the first and second ends of the core member, respectively, at least two spaced apart flow openings being provided through the first side of the core member in flow communication with each of said flow passages, including a further first plate member sealing at least some of the flow passage ends at the other end of the core member, and a further second plate member secured to the first side of the core member and defining a further flow path across the first side between further ones of the flow openings.

7. The heat exchanger of claim 1 wherein the core member is extruded and includes integral tubular walls located along the second side thereof defining the at least two flow passages.

8. The heat exchanger of claim 1 wherein said
   core member defines a plurality of said flow passage, and has first and second sets of said flow openings defined in one of said first and second sides, said first plate member and the second plate member together form a first unitary end cap connected to the first end of the core member, and the heat exchanger includes
   a second unitary end cap connected to the second end of the core member, the second end cap having a first section sealing adjacent flow passage ends of at least some of the flow passages, and a second section extending from the first section of the second end cap partially over the side of the core member defining the second set of flow openings, the second section defining with the core member at least one flow path between at least some of the second set of flow openings.

9. The heat exchanger according to claim 8 wherein a plurality of spaced apart fins extend outward from the second side.

10. The heat exchanger according to claim 9 wherein the spaced apart fins extend substantially parallel to a longitudinal axis of the core plate, and at least a portion of the core plate is curved about the longitudinal axis.

11. The heat exchanger according to claim 9 wherein the spaced apart fins extend substantially parallel to a longitudinal axis of the core plate, the core plate including first and second longitudinal edge portions on opposite sides of a central portion thereof, the longitudinal edge portions being angled relative to the central portion.

12. The heat exchanger according to claim 9 wherein the core member includes a substantially planar core plate having a first surface defining the first side of the core member, the plate having an opposite facing second surface along which a plurality of annular wall sections extend from the first end to the second end, the annular wall sections each defining a respective one of the flow passages.

13. The heat exchanger of claim 9 wherein the core member includes first and second spaced apart plates integrally connected by spaced apart walls that divide an area between the first and second plates into the plurality of flow passages.

14. The heat exchanger of claim 13 wherein the flow passages each have a trapezoidal cross-section, and the first and second end caps define with the core member flow paths connecting alternating flow passages for circuiting a first fluid and a second fluid separately through adjacent flow passages.

15. The heat exchanger of claim 9 wherein the flow passages are defined at least partially within the fins.

16. The heat exchanger of claim 12 wherein a plurality of air flow openings are provided through the planar core plate.

17. The heat exchanger of claim 8 wherein the heat exchanger is a multi-fluid heat exchanger, the first and second end caps defining with the core member the flow paths for connecting alternating flow passages for circuiting a first fluid and a second fluid separately through adjacent flow passages.

18. The heat exchanger according to claim 8 wherein the flow passages include first and last flow passages and a plurality of intermediate flow passages located therebetween, the heat exchanger including an inlet fitting mounted to the core member for providing a fluid to the first flow passage and an outlet fitting mounted to the core member for receiving the fluid from the last flow passage, the first and second end caps being configured to circuit the fluid from the first flow passage, through the intermediate flow passages, and then into the last flow passage.

19. The heat exchanger of claim 18 wherein the first and second end caps and the core member define the flow paths for circuiting the fluid serially through the intermediate flow passages.

20. The heat exchanger of claim 18 wherein the first and second end caps and the core member define the flow paths for circuiting the fluid in a parallel flow through at least some of the intermediate flow passages.

21. The heat exchanger of claim 18 wherein the first and last flow passages each have a larger cross-sectional flow area than the intermediate flow passages, the inlet fitting being secured to an end of the first flow passage and the outlet fitting being secured to an end of the last flow passage.

22. The heat exchanger of claim 21 wherein internally extending fins are defined by the core in each of the intermediate flow passages but not in the first and last flow passages.

23. The heat exchanger of claim 18 wherein at least one of the first member of the first end cap and the first section of the second end cap includes a fitting mounting portion that extends over the end of at least one of the first flow passage and the last flow passage, the fitting mounting portion defining an opening in alignment with the at least one of the first flow passage and the last flow passage, one of the fittings being brazed to the fitting mounting portion in flow cooperation with the at least one of the first flow passage and the last flow passage.

24. The heat exchanger of claim 8 wherein the first set of flow openings are located near the first end of the core member and the second set of flow openings are located near the second end of the core member.

25. The heat exchanger of claim 8 wherein the second member and the second section are substantially planar, the flow paths being defined by raised areas provided therein.

26. The heat exchanger of claim 25 wherein a first bend relief is formed where said second plate member is connected to the first plate member and a second bend relief is formed where said second section of the second end cap is connected to the first section.

27. The heat exchanger of claim 1 wherein a bend relief is formed where said second plate member is connected to the first plate member.

28. The heat exchanger of claim 1 wherein both said first plate member and the second plate member are formed out of brazing clad aluminum and are sealingly connected to said core member by brazing.

29. A method of forming a heat exchanger, including steps of:
providing an extruded core member defining a plurality of spaced apart flow passages, each of the flow passages having opposed first and second flow passage ends located at first and second ends of the core member, respectively, the core member having first and second sides extending from the first end to the second end thereof, one of said first and second sides defining a first set of flow openings communicating with the flow passages and one of said first and second sides defining a second set of flow openings communicating with the flow passages;
providing a first unitary end cap and mounting the first end cap to the first end of the core member, the first end cap having a first member sealing the first flow passage ends of at least some of the flow passages, and a second member integrally connected to the first member and extending from the first member of the first end cap partially over the side of the core member defining the first set of flow openings, the second member including a substantially planar portion secured to the side of the core member defining said first set and a crossover recess defined by an outwardly projecting area formed in the planar portion, the crossover recess of the second member and the core member defining at least one flow path between at least some of the first set of flow openings; and
providing a second unitary end cap and mounting the second end cap to the second end of the core member, the second end cap having a first member sealing the second flow passage ends of at least some of the flow passages, and a second member extending from the first member of the second end cap partially over the side of the core member, defining the second set of flow openings, the second member of the second end cap and the core member defining at least one flow path between at least some of the second set of flow openings.

30. The method of claim 29 wherein the core member is provided with a plurality of elongate fins extending from the first end to the second end of the core member, including steps of dividing outer ends of the fins into successive fin sections by applying spaced apart cuts across the outer ends, and bending the outer ends of the successive fin sections in alternating directions.

31. The method of claim 30 further including rounding corner edges of the outer ends at the spaced apart cuts.

* * * * *